Figure 1:
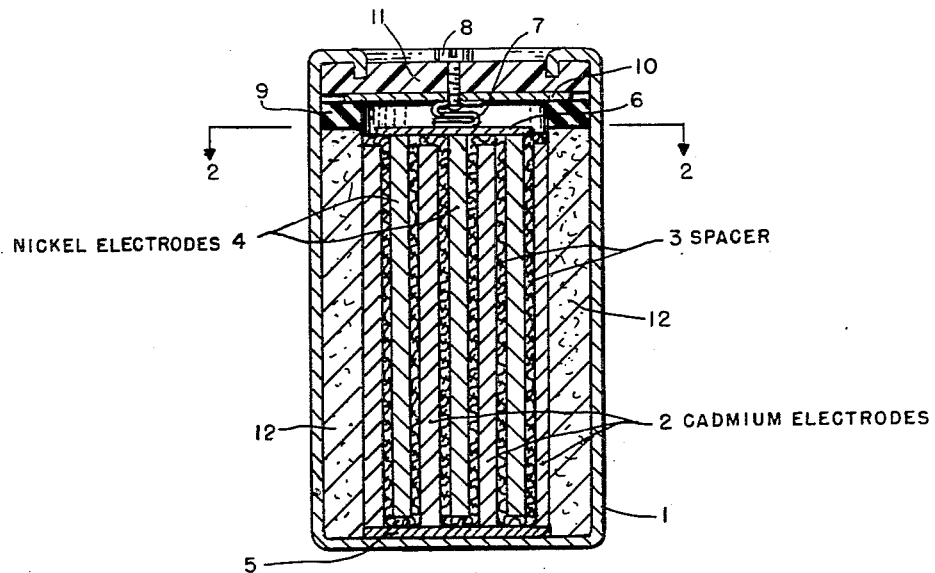

June 14, 1960   H. J. MANDEL   2,941,022
HERMETICALLY SEALED NICKEL-CADMIUM STORAGE BATTERY
Filed May 5, 1959

*INVENTOR,*
HYMAN J. MANDEL

BY *Harry M. Saragovitz*

ATTORNEY

2,941,022
HERMETICALLY SEALED NICKEL-CADMIUM STORAGE BATTERY

Hyman J. Mandel, West Long Branch, N.J., assignor to the United States of America as represented by the Secretary of the Army Filed May 5, 1959, Ser. No. 811,229

1 Claim. (Cl. 136—6)

(Granted under Title 35, U.S. Code (1952), sec. 266)

The invention described herein may be manufactured and used by or for the Government for governmental purposes without the payment of any royalty thereon.

This invention relates to hermetically sealed nickel-cadmium storage batteries.

In storage batteries the last stages of the charging procedure are marked by the liberation of hydrogen and oxygen at the electrodes which of course causes serious disadvantages in storage batteries of the sealed type.

Many attempts have been made to overcome these difficulties either by catalytic recombination of the gases formed or by means which prevent the formation of hydrogen while the oxygen formed is absorbed either by the electrodic material or by the grid material carrying the electrodic material. For this purpose it has been suggested to use flat, thin, closely spaced electrodes, separated by thin nonconductive and at least semipermeable separators as, for instance, cotton cloth or similar material. No visible release of gases is observed when current is being passed thru such cells during charging or discharging and it may be assumed according to one theory that due to the special design of such a cell proper access of oxygen to the negative cadmium plates is provided whereby the spongy metallic cadmium absorbs the oxygen to produce cadmium hydroxide.

It has also been suggested to provide a porous skeleton structure of sintered nickel for the active masses of the two electrodes and use a porous separator which substantially completely absorbs the alkaline electrolyte, leaving empty cavities in the rest of the hermetically sealed cell. At least one surface of this porous skeleton structure of sintered nickel remains uncovered by the active mass and this free nickel surface is supposed to serve as a means of absorbing the oxygen formed during the last stages of the charging procedure.

Although some progress has been made by these various means its has not yet been possible to obtain a hermetically sealed nickel-cadmium battery that would be completely reliable also on prolonged overcharging.

I now have found that hermetically sealed nickel-cadmium batteries may be obtained which are reliable also on prolonged overcharging by providing thin, flat, closely packed nickel and cadmium electrodes separated by thin, flat and at least semipermeable spacers in a hermetically sealed metal can in such a manner as to leave empty cavities between the closely packed cell elements and the inner walls of the hermetically sealed metal can, which cavities are filled with a metal structure of sponge-like character of such pore size that the metal surface can be wetted with the alkaline electrolyte without the electrolyte being retained within the pores of this structure by capillary forces. Stated differently, the pores of the sponge-like metal structure should be capable of retaining a film of electrolyte on the free metal surface while the gases formed during the charging can freely pass through the sponge-like metal structure.

This metal sponge may consist of nickel, platinum, iridium, or any other metal inert to the chemical and electrochemical reactions that are going on within the hermetically sealed cell. The only reaction which this metal sponge is expected to exhibit is a reaction on the wetted surface of the metal sponge leading to the transformation of oxygen gas into hydroxyl ions which then combine with the cadmium electrode to yield cadmium hydroxide. In order to catalyze this reaction the metal sponge has to be in direct electrical contact with the cadmium electrode.

Since the above-mentioned reactions take place only at the interphase of wetted metal surface and gas it is necessary that no more electrolytes be present in the hermetically sealed cell as can be absorbed by the separator and as is necessary to wet the surface of the spongy metal structure without completely filling the pores of this structure.

The invention is based on a theory that has been advanced to explain the fact that under certain experimental conditions the oxygen developed towards the end of the charging period is absorbed by the cadmium electrode to form cadmium hydroxide. According to this theory the oxygen liberated during charging forms an "oxygen electrode" which can be short-circuited to the negative cadmium electrode. The reaction between this "oxygen electrode" and the cadmium electrode results in the elimination of oxygen according to the following equation:

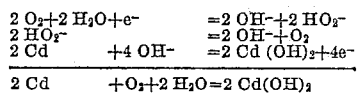

| | | |
|---|---|---|
| $2\ O_2 + 2\ H_2O + e^-$ | | $= 2\ OH^- + 2\ HO_2^-$ |
| $2\ HO_2^-$ | | $= 2\ OH^- + O_2$ |
| $2\ Cd$ | $+ 4\ OH^-$ | $= 2\ Cd(OH)_2 + 4e^-$ |
| Summation $2\ Cd$ | $+ O_2 + 2\ H_2O = 2\ Cd(OH)_2$ | |

The invention will become more apparent from a description of a specific embodiment consisting as shown in the accompanying drawing of a sealed nickel-cadmium battery having the form of a conventional flash-light battery.

Figure 2:
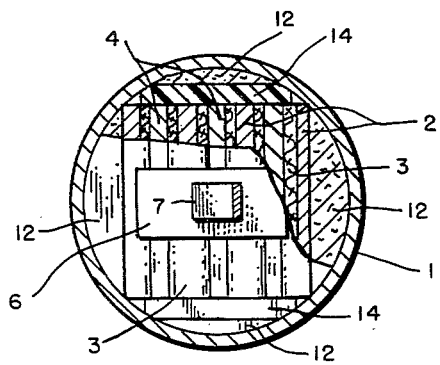

Figure 1 shows an elevational cross section of such a nickel-cadmium battery; and Figure 2 represents a cross sectional view along line 2—2 with the structure partially broken away to show the lower part of electrodes and spacers.

The battery shown in Figure 1 and Figure 2 consists of a steel can 1 in which there are provided thin, flat and closely packed cell elements consisting of cadmium electrodes 2, porous spacers 3 and nickel electrodes 4. All cadmium electrodes are connected by a metal plate 5, which plate 5 stays in direct electrical contact with the steel can 1. All nickel electrodes 4 are connected by a metal plate 6 which is in direct electrical contact with a metal spring 7 leading to the terminal 8.

A metal plate 10 is provided between the plastic insulating ring 9 and the lid 11 of insulating, gastight material. The upper edges of the can 1 are crimped gastight over the rim of the lid 11.

The empty spaces left between the closely packed cell elements and the inner walls of the can 1 are filled with a metal structure 12 of sponge-like character and of such pore-size that the metal surface can be wetted with the liquid electrolyte without this liquid electrolyte being retained within the pores of the metal structure by capillary forces. It may consist, for instance, of nickel-wool pressed together in the form of pads capable of retaining a film of electrolyte on the free metal surface of the nickel-wire while at the same time allowing free passage of the gases formed during charging.

The porous metal structure 12 is in direct electrical contact with the steel can 1 and thus with the cadmium electrodes 2. To prevent electrical contact between the neckel electrodes 4 and the metal structure 12, insulating plates 14 cover the edges of these nickel electrodes 4. The upper edges of the plates 14 serve as support for the ring 9.

The metal structure 12 forms, as previously mentioned, an "oxygen electrode" and the larger the surface area of this oxygen electrode the greater its capacity of eliminating oxygen formed during charging and overcharging.

No separate gas space communication between the cell electrodes and the gas electrodes are shown in the drawing since the cell elements themselves do not fit gastight in the can and the small amount of gas which slowly evolves will always seep thru the interstices between the cell elements and metal can and also thru the porous spacer.

It will be understood by those skilled in this art that various changes and modifications may be made within the specific embodiments disclosed above without departing from the invention as defined in the following claim.

What I claim is:

A permanently gastight, alkaline, nickel-cadmium rechargeable flashlight battery comprising a circular, thin, hermetically sealed stainless steel can, closely packed cell elements consisting substantially of rectangular, thin, flat, nickel and cadmium electrodes separated by rectangular, thin, flat, and at least semipermeable separators, a spongy metal structure within the cavities left between said closely packed, rectangular cell elements and the inner walls of said circular can, the metal of said spongy metal structure being selected from the group consisting of nickel, platinum and iridium, said spongy metal structure being structurally independent from but in direct electrical contact with the cadmium electrodes as well as with the metal can, the alkaline electrolyte being absorbed by the separators to such an extent that only a small excess amount of electrolyte is present to wet the free surface of the spongy metal structure while allowing the oxygen formed during charging to pass freely.

References Cited in the file of this patent

UNITED STATES PATENTS

| | | |
|---|---|---|
| 1,269,162 | Crowdus | June 11, 1918 |
| 2,131,592 | Lange et al. | Sept. 27, 1938 |
| 2,646,455 | Jeannin | July 21, 1953 |
| 2,798,110 | Peters | July 2, 1957 |

FOREIGN PATENTS

| | | |
|---|---|---|
| 741,345 | Great Britain | Nov. 30, 1955 |